United States Patent
Hays et al.

(10) Patent No.: US 9,448,124 B2
(45) Date of Patent: Sep. 20, 2016

(54) MULTIPLE TEMPERATURE SENSOR SYSTEM

(75) Inventors: Paul J Hays, Lafayette, CO (US); Craig B. McAnally, Thornton, CO (US); Andrew S. Kravitz, Erie, CO (US)

(73) Assignee: Micro Motion, Inc., Boulder, CO (US)

(*) Notice: Subject to any disclaimer, the term of this patent is extended or adjusted under 35 U.S.C. 154(b) by 620 days.

(21) Appl. No.: 13/883,113

(22) PCT Filed: Nov. 16, 2010

(86) PCT No.: PCT/US2010/056856
§ 371 (c)(1),
(2), (4) Date: May 2, 2013

(87) PCT Pub. No.: WO2012/067608
PCT Pub. Date: May 24, 2012

(65) Prior Publication Data
US 2013/0223480 A1    Aug. 29, 2013

(51) Int. Cl.
*G01K 7/16* (2006.01)
*G01K 3/04* (2006.01)
(Continued)

(52) U.S. Cl.
CPC .............. *G01K 13/00* (2013.01); *G01F 1/84* (2013.01); *G01F 1/849* (2013.01); *G01F 1/8418* (2013.01); *G01F 1/8431* (2013.01); *G01F 1/8436* (2013.01); *G01F 1/8468* (2013.01);
(Continued)

(58) Field of Classification Search
CPC .................................. G01K 7/16; G01K 3/04
USPC .......... 374/10–102, 163, 166, 137, 110, 170, 374/183, 185; 702/130
See application file for complete search history.

(56) References Cited

U.S. PATENT DOCUMENTS 3,429,925 A * 2/1969 Cour ..................... C07C 215/08
564/473
3,459,925 A * 8/1969 Wilson .................. G01K 1/024
324/106
(Continued)

FOREIGN PATENT DOCUMENTS

DE         811807       8/1951
KR   10-2012-0098131 A  3/2013

*Primary Examiner* — Gail Kaplan Verbitsky
(74) *Attorney, Agent, or Firm* — The Ollila Law Group LLC

(57) ABSTRACT

A multiple temperature sensor system (120) includes a temperature sensor network (180) including temperature-sensing resistors $R_{T1}$ and $R_{T2}$ (186, 187) and frequency-selective filters (184, 185) coupled to the plurality of temperature-sensing resistors $R_{T1}$ and $R_{T2}$ (186, 187). The frequency-selective filters (184, 185) pass distinct time-varying signals into the temperature sensor network (180) and pass attenuated distinct time-varying signals out. The system (120) further includes a temperature measurement N controller (161) coupled to the temperature sensor network (180) and configured to inject the distinct time-varying signals into the temperature sensor network (180), receive the attenuated distinct time-varying signals in response to the injection, with the attenuated distinct time-varying signals being attenuated by the temperature sensing resistors (186, 187), and generate two or more substantially simultaneous temperature values from the attenuated distinct time-varying signals.

22 Claims, 8 Drawing Sheets

(51) Int. Cl.
*G01K 13/00* (2006.01)
*G01F 1/84* (2006.01)
*G01K 1/02* (2006.01)
*G01K 7/20* (2006.01)
*G01F 15/02* (2006.01)

(52) U.S. Cl.
CPC ............ *G01F15/022* (2013.01); *G01K 1/026* (2013.01); *G01K 7/20* (2013.01)

(56) References Cited

U.S. PATENT DOCUMENTS

| | | | |
|---|---|---|---|
| 4,768,384 A | 9/1988 | Flecken et al. | |
| 5,095,453 A * | 3/1992 | Pierson | G01K 1/026 374/E1.005 |
| 5,381,697 A | 1/1995 | Van Der Pol | |
| 5,929,344 A | 7/1999 | Hays et al. | |
| 6,327,915 B1 | 12/2001 | Van Cleve et al. | |
| 6,612,737 B1 * | 9/2003 | Lobban | G01K 1/026 374/1 |
| 6,655,835 B2 | 12/2003 | Mattoon | |
| 6,910,804 B2 * | 6/2005 | Mattoon | G01K 1/026 374/1 |
| 7,038,996 B2 * | 5/2006 | Binnig | B82Y 10/00 369/101 |
| 7,322,743 B2 * | 1/2008 | Gozloo | G01K 1/026 374/163 |
| 7,367,712 B2 | 5/2008 | Becker et al. | |
| 7,375,576 B2 * | 5/2008 | Groiss | G06G 7/24 327/350 |
| 7,496,469 B2 | 2/2009 | Kovacevich | |
| 7,766,907 B2 * | 8/2010 | Dando | A61B 18/1492 374/110 |
| 2006/0119436 A1 * | 6/2006 | Seremeta | H03F 1/22 330/311 |
| 2009/0021314 A1 * | 1/2009 | Boerstler | H03L 1/022 331/66 |
| 2009/0063070 A1 * | 3/2009 | Renneberg | G01D 3/02 702/66 |
| 2013/0004811 A1 * | 1/2013 | Banerjee | G01K 7/16 429/62 |
| 2013/0121376 A1 * | 5/2013 | Mansfield | 374/170 |

\* cited by examiner

MULTIPLE TEMPERATURE SENSOR SYSTEM

BACKGROUND OF THE INVENTION

1. Field of the Invention

The invention is related to the field of temperature sensors, and more particularly, to temperature sensors including multiple elements.

2. Description of the Prior Art

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. When there is no flow through the flowmeter, all points along a flow tube oscillate with identical phase. As the material begins to flow, Coriolis accelerations cause each point along the flow tube to have a different phase with respect to other points along the flow tube. The phase on the inlet side of the flow tube lags the driver, while the phase on the outlet side leads the driver.

Mass flow rate may be determined by measuring time delay or phase differences between motions at the transducer locations. Frequency of the vibrational response may be measured by a single transducer, wherein the frequency is used to determine the density of material in the meter. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory flowmeters, including Coriolis mass flowmeters and densitometers, therefore employ one or more flow conduits that are vibrated in order to measure a fluid.

Fluid flow though a flow tube creates only a slight phase difference on the order of several degrees between the inlet and outlet ends of an oscillating flow tube. When expressed in terms of a time difference measurement, the phase difference induced by fluid flow is on the order of tens of microseconds down to nanoseconds. Typically, a commercial flow rate measurement should have an error of less than one-tenth of one percent. Therefore, a flow meter must be well designed in order to accurately measure these slight phase differences.

The vibrational characteristics of the vibrating structure change with changes in temperature. The vibrating flow tube(s) are typically formed from a metallic material having a Young's modulus that changes with temperature. In order to maintain high measurement accuracy, the temperature of the vibrating structure is typically measured and compensation is made for the change in Young's modulus with changes in temperature.

A Coriolis flowmeter system is comprised of two components; a flowmeter element and a transmitter. The flowmeter element is the actual sensor, containing vibrating tube(s), through which fluid flows while the transmitter is the signal processing device that receives and processes signals from the flowmeter element. Electrical connections between the flowmeter element and the transmitter are made over a multi-conductor cable. The shielded cable is comprised of a shielded conductor pair for providing a drive signal to the driver, second and third shielded conductor pairs for transmitting signals from the pick-off sensors and a shielded conductor triplet for transmitting a signal from a temperature sensor located on the vibrating flow tube. A three wire temperature sensor is typically used since this allows for a compensation of the resistance in the cable between the flowmeter element and the flowmeter transistor. This nine wire cable is not a standard cable in the process control industry. Therefore, each time a Coriolis flowmeter is installed using a transmitter mounted remotely from the flowmeter element, a special, non-standard cable must be run between the flowmeter element and the transmitter. This creates additional expense.

As flow meter technology develops, the performance demands (and changes to the geometry of the vibrating flow tubes) have brought about a need to make temperature measurements at multiple points on the flow meter element. A temperature measurement of the vibrating structure and a temperature measurement of the non-vibrating structure may be needed. Alternatively, a temperature measurement of a wetted portion of the vibrating structure and a temperature measurement of a non-wetted portion of the vibrating structure might be necessary. In any event, when more than one temperature sensor is used in existing Coriolis flow meter designs, conductors in addition to those available in the typical nine wire cable used with Coriolis flow meters are required. A cable having more than the traditional nine conductors is a problem for several reasons. One reason is that even the existing nine wire cable is expensive. Using a cable with even more conductors adds additional expense. Therefore, regardless of the number of temperature sensors, it is advantageous to minimize the number of conductors. Additional conductors in the cable require additional connectors on both the flowmeter element and the transmitter. This adds additional cost and can pose problems if there is not enough physical space for the additional connectors. This is particularly true for intrinsically safe applications.

Another reason why adding additional conductors to the cable is a problem is one of compatibility. Manufacturers incur additional expense and complexity where different types of flowmeter models require different cables. Also, there exists a large installed base of Coriolis flowmeters using nine wire cables. New flow meter designs can replace old flowmeters if the same cable is used.

There exists a need for a temperature sensor system that provides for multiple temperature sensors while minimizing the number of conductors between the flow meter element and the transmitter. There exists a further need for a flow meter employing two temperature sensors that utilizes the existing nine wire cable typically used with Coriolis flow meters.

FIG. 1 shows a Coriolis mass flow meter 5 comprising a meter assembly 10 and a meter electronics 20 coupled to the meter assembly 10 via a multi-conductor cable 100. The meter electronics 20 may provide density, mass flow rate, volume flow rate and/or temperature data over the path 26. A Coriolis flow meter structure is described although it is apparent to those skilled in the art that the present invention could alternatively comprise a vibrating tube densimeter 5.

The meter assembly 10 includes a pair of flanges 101 and 101' and corresponding manifolds 102 and 102'. Fluid enters the meter assembly 10 through one of the flanges 101 or 101' and passes through flow tube 103, leaving the meter assembly 10 through the other flange 101' or 101.

The flow tube 103 is encircled by a balance tube 104. The flow tube 103 is connected to the balance tube 104 and the balance tube 104 is connected to the case ends 105 and 105'. The case ends 105 and 105' form the end of the case 106.

The figure illustrates a straight flow tube 103, but those skilled in the art will recognize that the present invention can be applied to a flow meter system having a flow tube of any geometry. Also, a flow element having multiple flow tubes through which fluid flows is clearly within the scope of the present invention.

A driver 107 is connected to the balance tube 104 at the mid-point of the balance tube 104. One or more pick-off sensors 108 and 108' are connected to the balance tube 104 and the flow tube 103. In one embodiment of the present invention, each of the pick-off sensors 108 and 108' comprises a coil attached to the balance tube 104 and a magnet attached to the flow tube 103 and formed to move within the magnetic field that is generated when a periodic signal is applied to the coil. Those skilled in the art recognize that pick-off sensors of any design could be used, e.g., accelerometers or potentiometers, and that the velocity sensors described are merely exemplary.

A counterbalance 115 may be connected to the balance tube 104 diametrically opposite of the driver 107. The mass of the counterbalance 115 is determined by the density of the expected process fluid to be measured by the flow meter system 5. A flow tube temperature sensor 109 is attached to the flow tube 103 and a balance tube temperature sensor 110 is attached to the balance tube 104.

Cable 100 is comprised of a conductor 111 which carries the drive signal from the meter electronics 20 to the driver 107, conductors 112-113 which carry the pick-off signals from the left and right pick-off sensors 108 and 108' to the meter electronics 20, respectively, and a conductor 114 which carries temperature sensor information to the meter electronics 20. The conductors 111-113 may each comprise two conductors and the conductor 114 may comprise three separate conductors, such that cable 100 comprises nine component conductors.

The operation of the meter electronics 20 to produce mass flow rate, volume flow rate and density information is well known to those skilled in the art of flow measurement and does not form part of the present invention. The circuitry including the flow tube temperature sensor 109, balance tube temperature sensor 110, and the conductor 114 and the associated circuitry within the meter electronics 20 form the basis for the remaining description.

It is known to those skilled in the art that the Coriolis flow meter system 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the flow tube to vibrate. Vibrating tube densitometers typically utilize only a single feedback signal, i.e., from a single pick-off, since a density measurement requires only the measurement of frequency and a phase measurement is not necessary. The descriptions of the present invention herein apply equally to vibrating tube densitometers.

FIG. 2 shows a prior art resistive temperature network. The temperature sensor portion comprises the resistors or resistive temperature devices (RTDs) 110 and 109. A direct current (DC) voltage is provided through the switch (F0) and creates electrical currents through the temperature resistors, among others. The resulting electrical currents create voltage drops across the temperature sensing resistors. The voltage drops will vary with the resistance of the temperature sensing resistors, which will in turn be dependent on temperature. The voltages across the resistors 110 and 109 are sensed and used to determine the corresponding temperatures at the resistors 110 and 109.

A disadvantage in the prior art is that multiple measurements are required in order to read the values of the resistive elements 110 and 109. The prior art circuit requires eight voltage measurements; four voltage measurements with the switch (F0) on, and four more voltage measurements with the switch (F0) off.

Another disadvantage in the prior art is that a multiplexer (MUX) is needed in order to switch between various DC voltages in the resistive network for the purpose of making the required voltage measurements. Consequently, each of the eight voltages must be sequentially connected to the voltage-to-frequency (V/F) converter and digitized/measured. Temperature is measured serially, with each voltage measurement occurring at a successive time period, wherein a temperature measurement requires eight such measurement periods. Therefore, where the temperature may be changing rapidly, there is a delay in measuring the voltages and the resulting temperature value may not be up to date.

What is needed, therefore, are improvements in measuring temperature using a temperature network.

ASPECTS OF THE INVENTION

In some aspects of the invention, a multiple temperature sensor system comprises:
  a temperature sensor network comprising:
    a plurality of temperature-sensing resistors $R_{T1}$ and $R_{T2}$; and
    a plurality of frequency-selective filters coupled to the plurality of temperature-sensing resistors $R_{T1}$ and $R_{T2}$, with the plurality of frequency-selective filters passing a plurality of distinct time-varying signals into the temperature sensor network and passing a plurality of attenuated distinct time-varying signals out of the temperature sensor network; and
  a temperature measurement controller coupled to the temperature sensor network and configured to inject the plurality of distinct time-varying signals into the temperature sensor network, receive the plurality of attenuated distinct time-varying signals from the temperature sensor network in response to the injection, with the plurality of attenuated distinct time-varying signals being attenuated by the plurality of temperature sensing resistors, and generate two or more substantially simultaneous temperature values from the plurality of attenuated distinct time-varying signals.

Preferably, the multiple temperature sensor system is used in a Coriolis mass flow meter.

Preferably, the multiple temperature sensor system is used in a vibrating densitometer.

Preferably, the plurality of frequency-selective filters comprises a plurality of frequency-selective input filters coupled to the plurality of temperature-sensing resistors $R_{T1}$ and $R_{T2}$ and passing the plurality of distinct time-varying signals from the temperature measurement controller into the temperature sensor network and a plurality of frequency-selective output filters coupled to the plurality of temperature-sensing resistors $R_{T1}$ and $R_{T2}$ and passing the plurality of attenuated distinct time-varying signals from the temperature sensor network into the temperature measurement controller.

Preferably, the plurality of frequency-selective filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and five frequency-selective output filters coupled to the plurality of temperature-sensing resistors $R_{T1}$ and $R_{T2}$ and passing at least four attenuated distinct time-varying signals from the temperature sensor network into the temperature measurement controller.

Preferably, the plurality of frequency-selective filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and five frequency-selective output filters coupled to the plurality of temperature-sensing resistors $R_{T1}$ and $R_{T2}$ and passing at least four attenuated distinct time-varying signals from the temperature sensor network into the temperature measurement controller, with the five frequency-selective output filters including two outputs to the temperature measurement controller.

Preferably, the plurality of frequency-selective filters comprises a plurality of frequency-selective input filters coupled to the plurality of temperature-sensing resistors $R_{T1}$ and $R_{T2}$ and passing the plurality of distinct time-varying signals from the temperature measurement controller into the temperature sensor network and a multiplexer coupled to the plurality of temperature-sensing resistors $R_{T1}$ and $R_{T2}$ and passing the plurality of attenuated distinct time-varying signals from the temperature sensor network into the temperature measurement controller.

Preferably, the plurality of frequency-selective filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and eight frequency-selective output filters coupled to the plurality of temperature-sensing resistors $R_{T1}$ and $R_{T2}$ and passing at least four attenuated distinct time-varying signals from the temperature sensor network into the temperature measurement controller.

Preferably, the plurality of frequency-selective filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and eight frequency-selective output filters coupled to the plurality of temperature-sensing resistors $R_{T1}$ and $R_{T2}$ and passing at least four attenuated distinct time-varying signals from the temperature sensor network into the temperature measurement controller, with the eight frequency-selective output filters including a single output to the temperature measurement controller.

Preferably, the plurality of frequency-selective filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and five frequency-selective output filters coupled to the plurality of temperature-sensing resistors $R_{T1}$ and $R_{T2}$ and passing at least four attenuated distinct time-varying signals from the temperature sensor network into the temperature measurement controller, with the five frequency-selective output filters including a single output to the temperature measurement controller.

In some aspects of the invention, a multiple temperature sensor system comprises:
   a temperature sensor network comprising:
      a plurality of temperature-sensing resistors $R_{T1}$ and $R_{T2}$;
      a plurality of frequency-selective input filters coupled to the plurality of temperature-sensing resistors $R_{T1}$ and $R_{T2}$ and passing a plurality of distinct time-varying signals into the temperature sensor network; and
      a plurality of frequency-selective output filters coupled to the plurality of temperature-sensing resistors $R_{T1}$ and $R_{T2}$ and passing a plurality of attenuated distinct time-varying signals out of the temperature sensor network; and
   a temperature measurement controller coupled to the temperature sensor network and configured to inject the plurality of distinct time-varying signals into the temperature sensor network, receive the plurality of attenuated distinct time-varying signals from the temperature sensor network in response to the injection, with the plurality of attenuated distinct time-varying signals being attenuated by the plurality of temperature sensing resistors, and generate two or more substantially simultaneous temperature values from the plurality of attenuated distinct time-varying signals.

Preferably, the multiple temperature sensor system is used in a Coriolis mass flow meter.

Preferably, the multiple temperature sensor system is used in a vibrating densitometer.

Preferably, the plurality of frequency-selective input filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and the plurality of frequency-selective output filters comprises five frequency-selective output filters coupled to the plurality of temperature-sensing resistors $R_{T1}$ and $R_{T2}$ and passing at least four attenuated distinct time-varying signals from the temperature sensor network into the temperature measurement controller, with the five frequency-selective output filters including two outputs to the temperature measurement controller.

Preferably, the plurality of frequency-selective output filters comprises a multiplexer coupled to the plurality of temperature-sensing resistors $R_{T1}$ and $R_{T2}$ and passing the plurality of attenuated distinct time-varying signals from the temperature sensor network into the temperature measurement controller.

Preferably, the plurality of frequency-selective input filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and the plurality of frequency-selective output filters comprises eight frequency-selective output filters coupled to the plurality of temperature-sensing resistors $R_{T1}$ and $R_{T2}$ and passing at least four attenuated distinct time-varying signals from the temperature sensor network into the temperature measurement controller.

Preferably, the plurality of frequency-selective input filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and the plurality of frequency-selective output filters comprises eight frequency-selective output filters coupled to the plurality of temperature-sensing resistors $R_{T1}$ and $R_{T2}$ and passing at least four attenuated distinct time-varying signals from the temperature sensor network into the temperature measurement controller, with the eight frequency-selective output filters including a single output to the temperature measurement controller.

Preferably, the plurality of frequency-selective input filters comprises two frequency-selective input filters coupled to the plurality of temperature-sensing resistors $R_{T1}$ and $R_{T2}$ and passing four time-varying signals from the temperature measurement controller into corresponding nodes of the temperature sensor network and the plurality of frequency-selective output filters comprises five frequency-selective output filters coupled to the plurality of temperature-sensing resistors $R_{T1}$ and $R_{T2}$ and passing at least four attenuated distinct time-varying signals from the temperature sensor network into the temperature measurement controller, with the five frequency-selective output filters including a single output to the temperature measurement controller.

In some aspects of the invention, a temperature determination method for a multiple temperature sensor system comprises:
  injecting a plurality of distinct time-varying signals into a temperature sensor network including a plurality of temperature-sensing resistors and a plurality of frequency-selective filters;
  receiving a plurality of attenuated distinct time-varying signals from the temperature sensor network in response to the injection, with the plurality of attenuated distinct time-varying signals being attenuated by the plurality of temperature sensing resistors; and
  generating two or more substantially simultaneous temperature values from the plurality of attenuated distinct time-varying signals.

Preferably, the multiple temperature sensor system is used in a Coriolis mass flow meter.

Preferably, the multiple temperature sensor system is used in a vibrating densitometer.

Preferably, the plurality of frequency-selective filters comprises a plurality of frequency-selective input filters coupled to the plurality of temperature-sensing resistors $R_{T1}$ and $R_{T2}$ and passing the plurality of distinct time-varying signals from the temperature measurement controller into the temperature sensor network and a plurality of frequency-selective output filters coupled to the plurality of temperature-sensing resistors $R_{T1}$ and $R_{T2}$ and passing the plurality of attenuated distinct time-varying signals from the temperature sensor network into the temperature measurement controller.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 3-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 3:
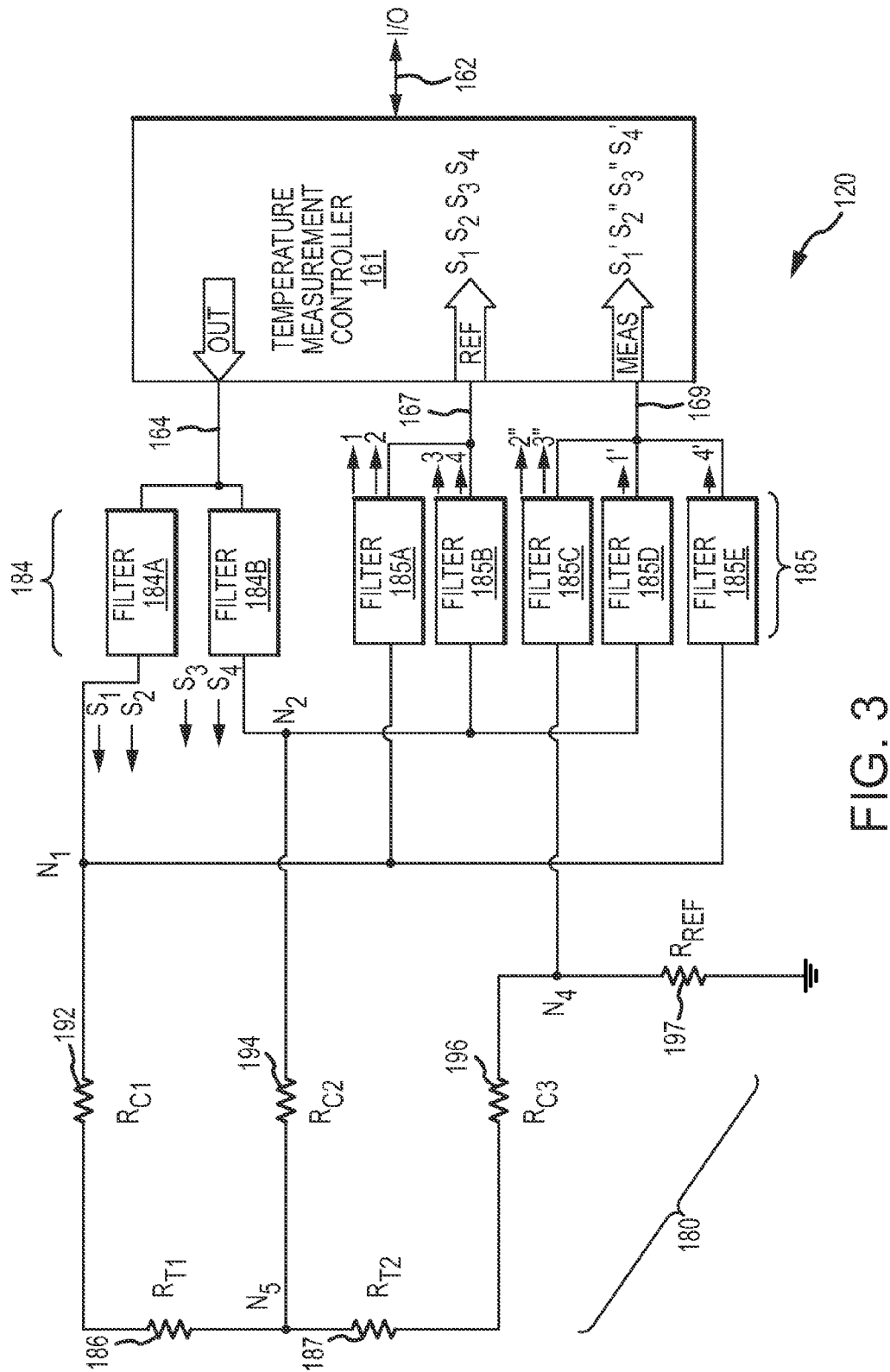
FIG. 3 shows a multiple temperature sensor system according to the invention.

FIG. 3 shows a multiple temperature sensor system 120 according to the invention. The multiple temperature sensor system 120 can comprise a component of a Coriolis mass flow meter or can comprise a component of a vibrating densitometer, for example, although the multiple temperature sensor system 120 can be employed in other meters or devices.

The multiple temperature sensor system 120 includes a temperature measurement controller 161 that is connected to a temperature sensor network 180. The temperature measurement controller 161 can comprise any suitable processing device or circuitry, including, for example, an audio coder-decoder (codec) or a stereo audio codec. The temperature sensor network 180 includes a plurality of frequency-selective input filters 184, a plurality of frequency-selective output filters 185, a plurality of temperature-sensing resistors $R_{T1}$ and $R_{T2}$ 186 and 187, a plurality of cable resistances $R_{C1}$ 192, $R_{C2}$ 194, and $R_{C3}$ 196, and a reference resistor $R_{REF}$ 197.

The temperature measurement controller 161 is configured to inject a plurality of distinct time-varying signals into the temperature sensor network 180, receive a plurality of attenuated distinct time-varying signals from the temperature sensor network 180 in response to the injection, with the plurality of attenuated distinct time-varying signals being attenuated by the plurality of temperature sensing resistors 186, 187, and generate two or more substantially simultaneous temperature values from the plurality of attenuated distinct time-varying signals.

The plurality of distinct time-varying signals can comprise alternating current (AC) signals, for example. The plurality of distinct time-varying signals can comprise a sinusoid, a square wave, a pulse train, or any other suitable time-varying signal.

Each signal of the plurality of distinct time-varying signals is at a distinct frequency (or frequency band). The separation between frequencies or frequency bands is only the separation required in order to discriminate between signals. As a result, when the signals are injected into the temperature sensor network 180 and provided to specific nodes and components through filtering, then the impedances of specific components can be measured. Specifically, the impedances of the plurality of temperature-sensing resistors $R_{T1}$ and $R_{T2}$ 186, 187 can be determined and the impedances can subsequently be used for temperature measurements. The impedances of specific components can be measured by determining drops in amplitude in each of the distinct time-varying signals.

The plurality of frequency-selective filters 184, 185 can comprise any suitable filters. The filters can include low pass filters, high pass filters, band pass filters, or notch filters, given as examples and not for limitation. The filters can comprise single filters or groups of filters. The filters can comprise analog or digital filters, and the time-varying signals can comprise analog or digital time-varying signals.

In one embodiment, the plurality of frequency-selective filters 184, 185 comprises a plurality of frequency-selective input filters 184 coupled to the plurality of temperature-sensing resistors $R_{T1}$ and $R_{T2}$ 186, 187 and passing the plurality of distinct time-varying signals from the temperature measurement controller 161 into the temperature sensor network 180 and a plurality of frequency-selective output filters 185 coupled to the plurality of temperature-sensing resistors $R_{T1}$ and $R_{T2}$ 186, 187 and passing the plurality of attenuated distinct time-varying signals from the temperature sensor network 180 into the temperature measurement controller 161.

In another embodiment, the plurality of frequency-selective filters 184, 185 comprises two frequency-selective input filters 184A, 184B coupled to the plurality of temperature-sensing resistors $R_{T1}$ and $R_{T2}$ 186, 187 and passing four time-varying signals from the temperature measurement controller 161 into corresponding nodes of the temperature sensor network 180 and five frequency-selective output filters 185A-185E coupled to the plurality of temperature-sensing resistors $R_{T1}$ and $R_{T2}$ 186, 187 and passing at least four attenuated distinct time-varying signals from the temperature sensor network 180 into the temperature measurement controller 161. The five frequency-selective output filters 185A-185E include two outputs to the temperature measurement controller 161.

Figure 1:
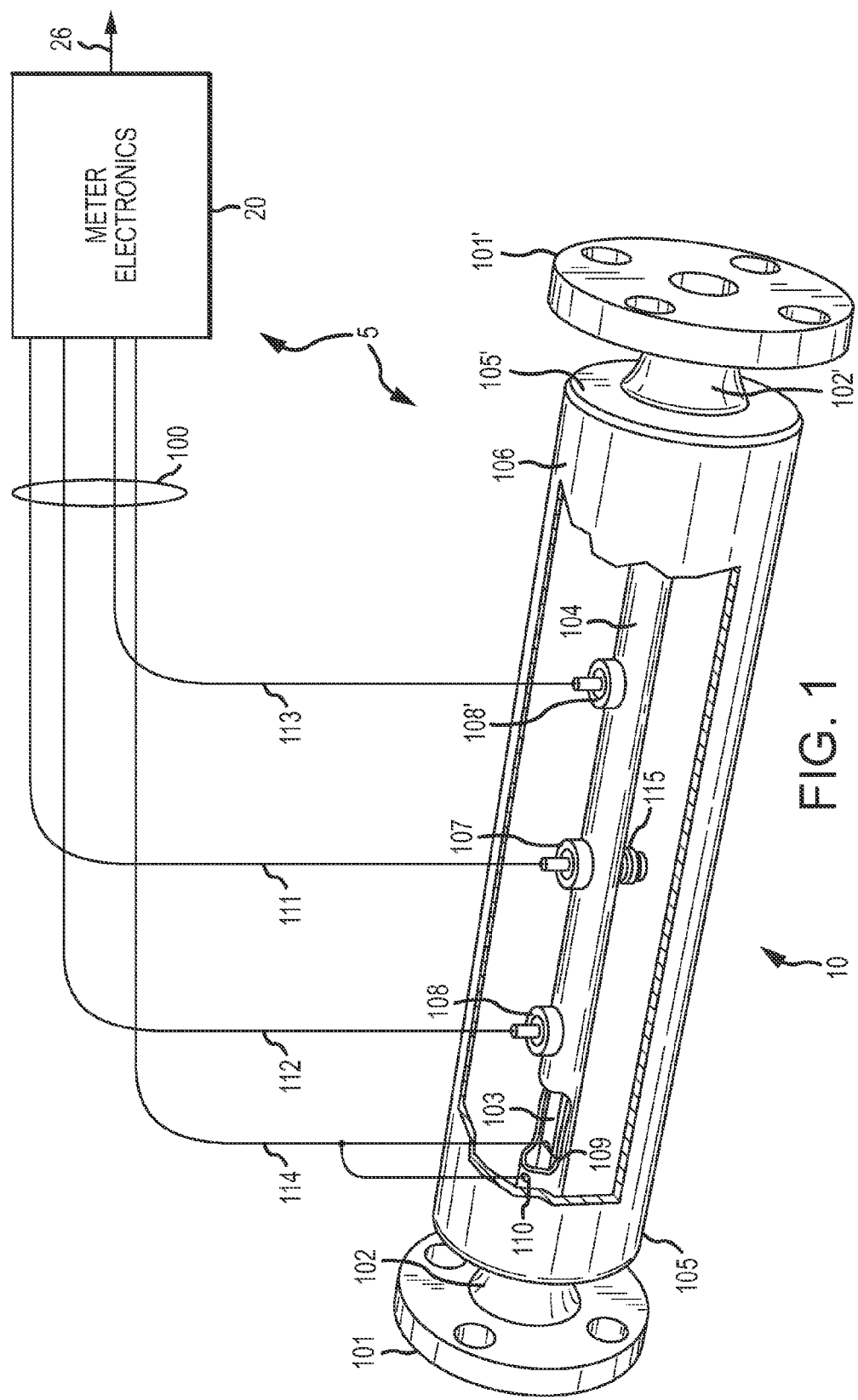
FIG. 1 shows a Coriolis flow meter comprising a meter assembly and a meter electronics coupled to the meter assembly via a multi-conductor cable.
Figure 2:
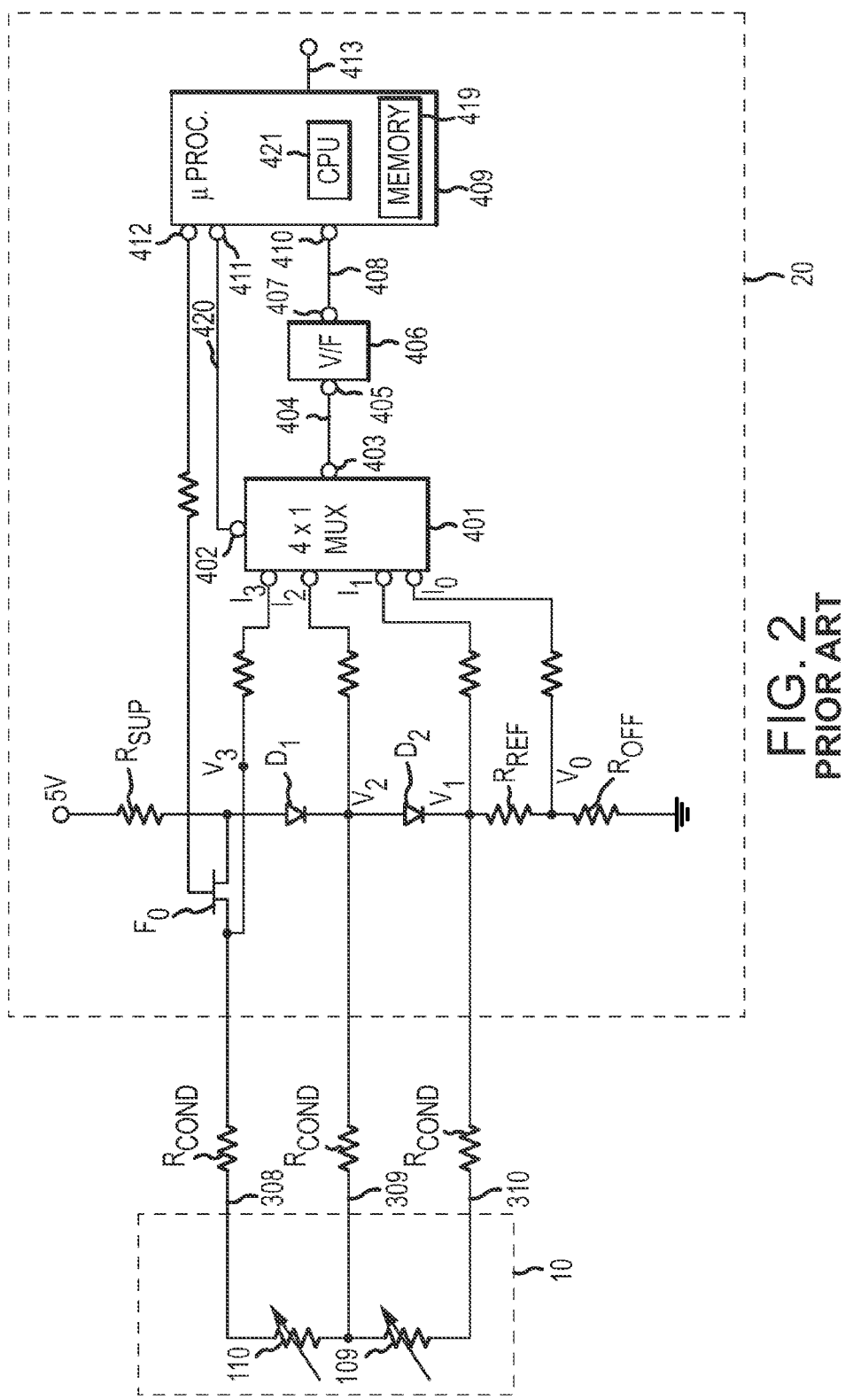
FIG. 2 illustrates a prior art resistive temperature measurement network.
Figure 4:
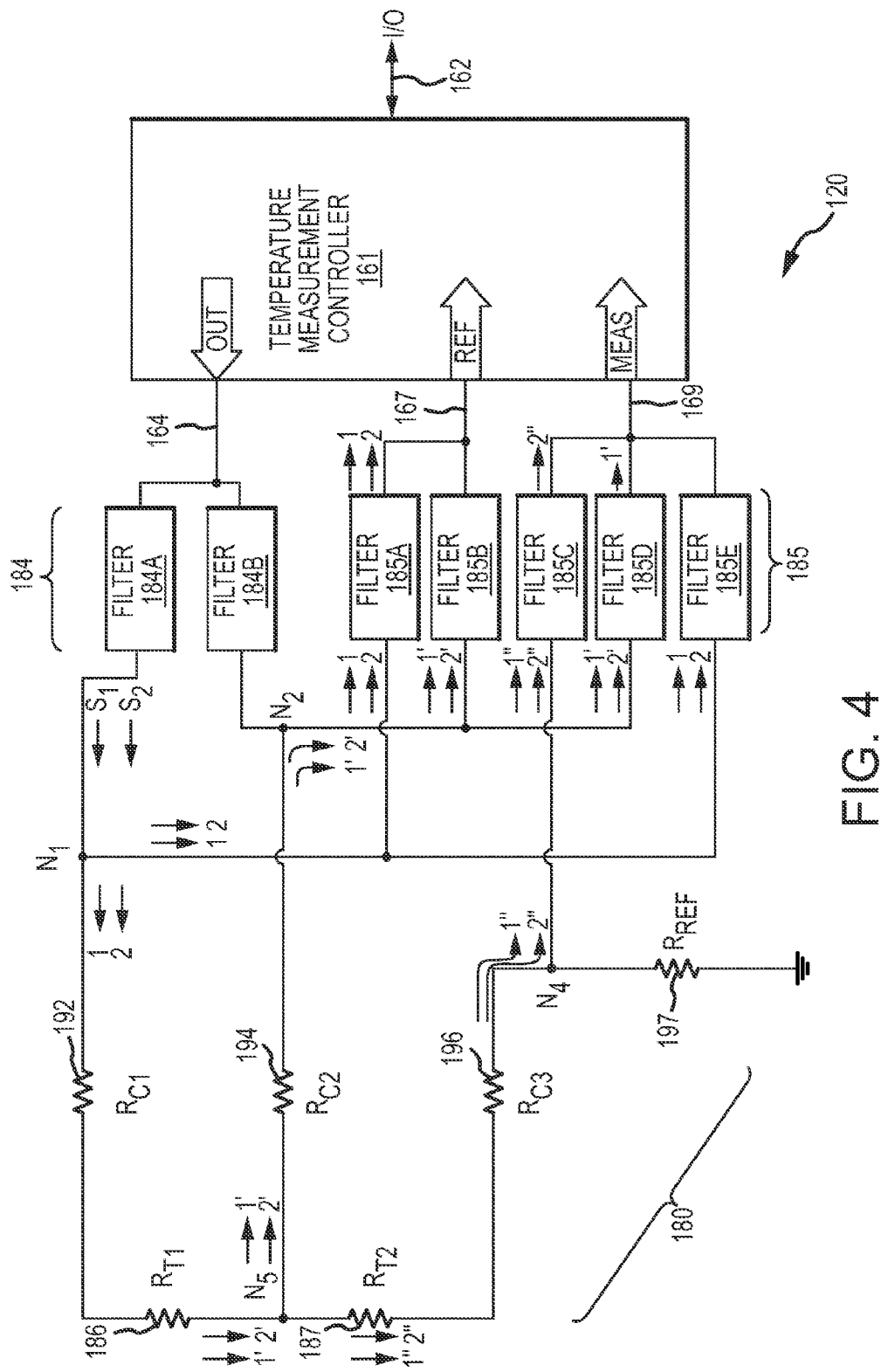
FIG. 4 illustrates the multiple temperature sensor system of FIG. 3 during operation, showing only the first and second injected time-varying signals for simplicity and clarity.
Figure 5:
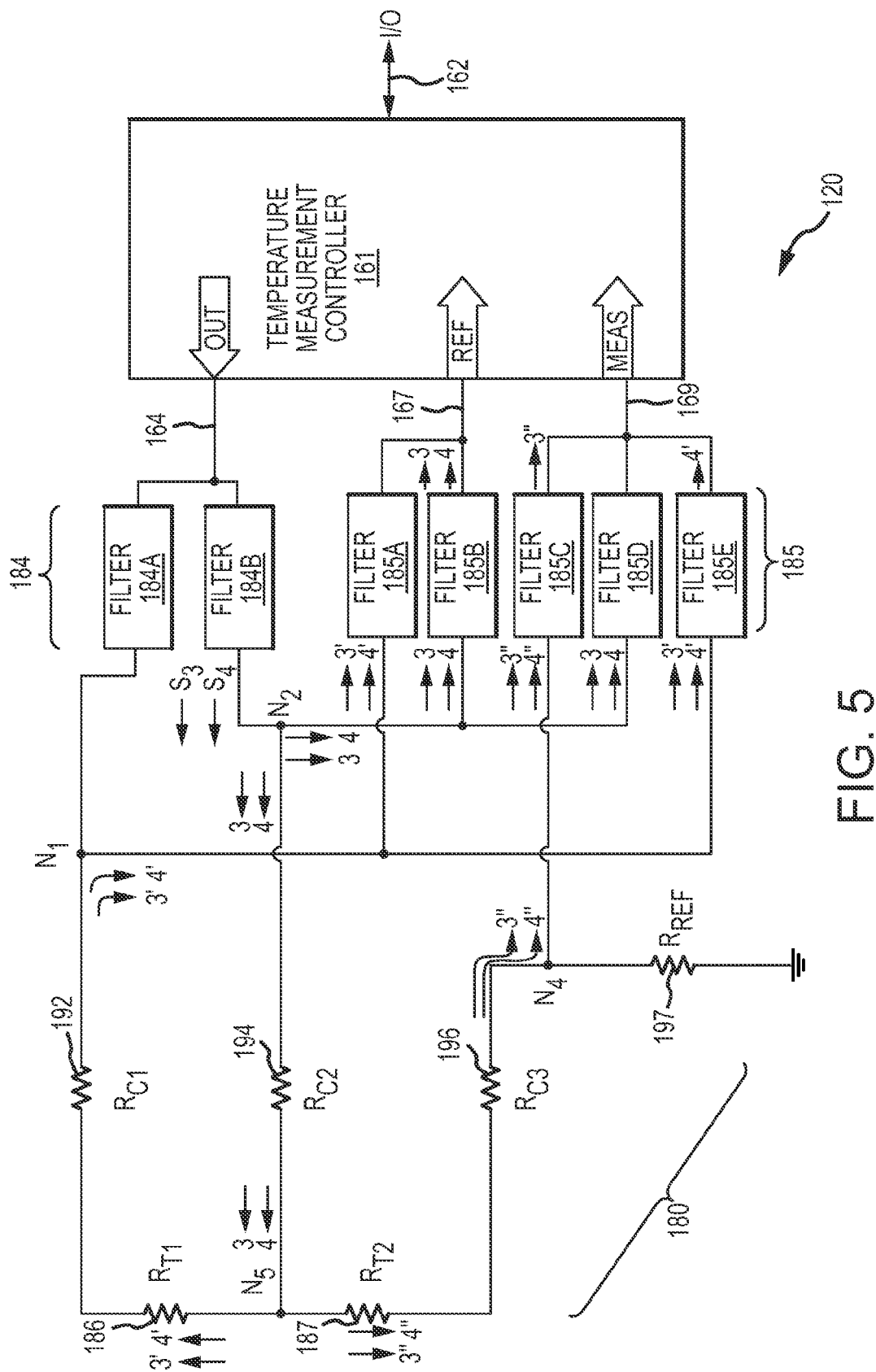
FIG. 5 illustrates the multiple temperature sensor system of FIG. 3 during operation, showing only the third and fourth injected time-varying signals for simplicity and clarity.

The temperature-sensing resistors $R_{T1}$ 186 and $R_{T2}$ 187 may correspond to the temperature sensors 110 and 109 of the circuit shown in FIG. 2. The temperature-sensing resistors $R_{T1}$ and $R_{T2}$ 186 and 187 will be affixed to (or are otherwise in thermal communication with) various flow meter components, such as a flow tube and a case or support. As a result, the resistances of the temperature-sensing resistors $R_{T1}$ and $R_{T2}$ 186 and 187 will change due to changes in temperature in the flow meter. The output filters 185 and the input filters 184 can comprise any suitable filters or filter systems, including bandpass or notch filters, for example. Operation of the multiple temperature sensor system 120 is shown in FIGS. 4-5 and the accompanying text.

In operation, the temperature measurement controller 161 injects a plurality of distinct time-varying signals into the temperature sensor network 180. The temperature measurement controller 161 can generate the plurality of distinct time-varying signals or can receive them over the communication link 162. The temperature measurement controller 161 subsequently receives back from the temperature sensor network 180 a plurality of attenuated time-varying signals in response to the injection. The plurality of attenuated time-varying signals can be equal to or different in number from the plurality of distinct time-varying signals that were directed into the temperature sensor network 180. The temperature measurement controller 161 generates two or more substantially simultaneous temperature measurement values from the plurality of attenuated time-varying signals. For example, the temperature measurement controller 161 can generate a first temperature measurement value related to the first temperature-sensing resistor $R_{T1}$ 186 and can generate a second temperature measurement value related to the second temperature-sensing resistor $R_{T2}$ 187. The number of temperature measurement values will depend on the configuration of the temperature sensor network 180 and the number of temperature-responsive resistive devices therein.

The temperature sensor network 180 performs temperature sensing through one or more temperature-responsive resistive devices, such as the two temperature-sensing resistors $R_{T1}$ 186 and $R_{T2}$ 187. By using AC or time-varying signals, it is possible to simultaneously determine the voltages at four different nodes, along multiple paths.

In some embodiments, the temperature-responsive resistive devices can comprise resistor temperature devices (RTDs) commonly used for electronic temperature measurement. However, other devices are contemplated and are within the scope of the description and claims. Although the present invention is described in terms of resistive temperature sensors, those skilled in the art recognize that any type of resistive sensor could be used in place of a temperature sensor. For example, one might use a strain gauge which indicates strain in the form of a variable resistance in place of one or more of the temperature sensors described herein. The present invention can employ any sensor that indicates a condition by changing resistance.

In the embodiment shown, two temperature-responsive resistive devices are employed. However, more than two temperature-responsive resistive devices can be included in the temperature sensor network 180, as desired.

The first temperature-sensing resistor $R_{T1}$ 186 receives the first and second time-varying signals $S_1$ and $S_2$ via the first node $N_1$ and the first cable resistance $R_{C1}$ 192. The first temperature-sensing resistor $R_{T1}$ 186 attenuates the first and second time-varying signals $S_1$ and $S_2$ to produce the first attenuated, first and second time-varying signals $S_1'$ and $S_2'$ (see FIG. 4). In addition, the first temperature-sensing resistor $R_{T1}$ 186 receives the third and fourth time-varying signals $S_3$ and $S_4$ via the second node $N_2$, the second cable resistance $R_{C2}$ 194, and the fifth node $N_5$. The first temperature-sensing resistor $R_{T1}$ 186 attenuates the third and fourth time-varying signals $S_3$ and $S_4$ to produce the first attenuated, third and fourth time-varying signals $S_3'$ and $S_4'$ (see FIG. 5).

The amount of attenuation will depend on the level of AC impedance of the first temperature-sensing resistor $R_{T1}$ 186. The level of impedance will in turn depend on the temperature of the first temperature-sensing resistor $R_{T1}$ 186. The time-varying signals passing through the first temperature-sensing resistor $R_{T1}$ 186 will therefore be attenuated according to temperature. Preferably, the temperature dependence of the first temperature-sensing resistor $R_{T1}$ 186 will be substantially linear, at least for the range of interest.

The second temperature-sensing resistor $R_{T2}$ 187 receives the already attenuated first and second time-varying signals $S_1'$ and $S_2'$ from the first temperature-sensing resistor $R_{T1}$ 186 and via the fifth node $N_5$. The second temperature-sensing resistor $R_{T2}$ 187 further attenuates the first attenuated, first and second time-varying signals $S_1'$ and $S_2'$ to produce a second attenuated, first and second time-varying signals $S_1''$ and $S_2''$. In addition, the second temperature-sensing resistor $R_{T2}$ 187 receives the third and fourth time-varying signals $S_3$ and $S_4$ via the second node $N_2$, the second cable resistance $R_{C2}$ 194, and the fifth node $N_5$. The second temperature-sensing resistor $R_{T2}$ 187 attenuates the third and fourth time-varying signals $S_3$ and $S_4$ to produce second attenuated, third and fourth time-varying signals $S_3''$ and $S_4''$ (see FIG. 5).

The amount of attenuation will depend on the level of impedance of the second temperature-sensing resistor $R_{T2}$ 187, as discussed for the first temperature-sensing resistor $R_{T1}$ 186. The level of impedance will in turn depend on the temperature of the second temperature-sensing resistor $R_{T2}$ 187.

The reference resistor $R_{REF}$ 197 in the embodiment shown is connected between the third cable resistance $R_{C3}$ 196 and electrical ground. The reference resistor $R_{REF}$ 197 keeps the signals $S_1$-$S_4$ above a base level and biases the time-varying signals $S_1$-$S_4$ above zero. Further, the reference resistor $R_{REF}$ 197 may be used to set an overall impedance of the temperature sensor network 100.

The temperature measurement controller 161 includes a signal output (OUT) 164, two inputs (REF) 167 and (MEAS) 169, and may include one or more communication links 162 to other devices. For example, the temperature measurement controller 161 may include a digital communication link 162 that can relay digital temperature measurements to other devices. In a vibratory flow meter application, the communication link 162 may be connected to meter electronics 20 for measuring a mass flow rate, density, and/or other flow meter outputs.

The temperature measurement controller 161 generates a plurality of time-varying signals of predetermined distinct frequencies (or distinct frequency bands) at the signal output 164. The time-varying signals may be spaced apart by a predetermined amount. The time-varying signals may be spaced apart by regular or varying amounts. The time-varying signals may be substantially sinusoidal or can be non-sinusoidal, including square or triangular waves, et cetera. The time-varying signals may be generated based on signals or information received from external devices, or may be generated internally in the temperature measurement controller 161.

In the embodiment shown, the temperature measurement controller 161 generates four distinct time-varying signals $S_1$-$S_4$ at the output 164 and injects the signals into the temperature sensor network 180. In the embodiment shown, the output 164 is coupled to the frequency-selective input filters 184A and 184B in the embodiment shown. The first input filter 184A in this embodiment is configured to pass the first pair of injected time-varying signals $S_1$ and $S_2$. Correspondingly, the second input filter 184B in this embodiment is configured to pass the second pair of injected time-varying signals $S_3$ and $S_4$.

In some embodiments, the first pair of time-varying signals $S_1$ and $S_2$ can comprise the two lower frequency time-varying signals, for example. However, the input filters 184 can be arranged in any desired manner, wherein the resulting time-varying signals can be received and discriminated at the signal inputs 167 and 169 of the temperature measurement controller 161.

The output filters 185 are configured to pass predetermined signals to the temperature measurement controller 161 and block others. As a result, specific attenuated signals and specific non-attenuated signals are passed to the temperature measurement controller 161 for temperature measurement value generation. In one embodiment, the input 167 of the temperature measurement controller 161 receives the unattenuated signals S1-S4, while the input 169 receives the attenuated signals $S_1'$, $S_2''$, $S_3''$, and $S_4'$. The electrical flow that produces these signal sets will be discussed below in conjunction with FIGS. 4 and 5.

FIG. 4 illustrates the multiple temperature sensor system 120 of FIG. 3 during operation, showing only the first and second injected time-varying signals $S_1$ and $S_2$ for simplicity and clarity. The input filters are configured to divide the time-varying signals between the first node $N_1$ and the second node $N_2$. In the embodiment shown, the signals $S_1$ and $S_2$ are directed into the first node $N_1$ and a first circuit path, while signals $S_3$ and $S_4$ are directed into the second node $N_2$ and a second circuit path. The first node $N_1$ receives the first and second signals $S_1$ and $S_2$ from the first input filter 184A.

The first input filter 184A substantially passes the first and second signals $S_1$ and $S_2$ and substantially blocks the third and fourth signals $S_3$ and $S_4$. The first cable resistance $R_{C1}$ 192 couples the first and second signals $S_1$ and $S_2$ to the first temperature-sensing resistor 186 via the first node $N_1$.

The first temperature-sensing resistor $R_{T1}$ 186 attenuates the first and second signals $S_1$ and $S_2$, producing the first attenuated, first and second signals $S_1'$ and $S_2'$. The first attenuated, first and second signals $S_1'$ and $S_2'$ pass through the fifth node $N_5$ and a portion of the signals will pass through the second cable resistance $R_{C2}$ 194 while a portion of the signals will pass through the second temperature-sensing resistor $R_{T2}$ 187. The amount of electrical current passing through the second cable resistance $R_{C2}$ 194 will depend on the impedances of the second temperature-sensing resistor $R_{T2}$ 187 and the second cable resistance $R_{C2}$ 194. After passing through the second cable resistance $R_{C2}$ 194, the first attenuated, first and second signals $S_1'$ and $S_2'$ will subsequently pass through the second node $N_2$ and then into both the second output filter 185B and the fourth output filter 185D.

The second temperature-sensing resistor $R_{T2}$ 187 attenuates the first attenuated, first and second signals $S_1'$ and $S_2'$, producing the second attenuated, first and second signals $S_1''$ and $S_2''$. The second attenuated, first and second signals $S_1''$ and $S_2''$ will subsequently pass through the third cable resistance $R_{C3}$ 196, through the fourth node $N_4$, and then into the third output filter 185C.

The first output filter 185A receives the first and second signals $S_1$ and $S_2$ via the first input filter 184A and the first node $N_1$. The first and second signals $S_1$ and $S_2$ are unattenuated. The first output filter 185A in some embodiments is configured to pass the first and second signals $S_1$ and $S_2$. Consequently, the first output filter 185A may output the first and second signals $S_1$ and $S_2$ to the input 167 of the temperature measurement controller 161. These unattenuated first and second signals $S_1$ and $S_2$ may be used for comparisons to attenuated versions.

The second output filter 185B receives the first attenuated, first and second signals $S_1'$ and $S_2'$. The second output filter 185B in some embodiments is configured to pass neither of the first attenuated, first and second signals $S_1'$ and $S_2'$. Consequently, the second output filter 185B does not output any portion of the first and second signals $S_1$ and $S_2$.

The third output filter 185C receives the second attenuated, first and second signals $S_1''$ and $S_2''$. The third output filter 185C in some embodiments is configured to pass only the second attenuated, second signal $S_2''$. Consequently, the third output filter 185C may output the second attenuated, second signal $S_2''$ to the input 169 of the temperature measurement controller 161.

The fourth output filter 185D receives first attenuated, first and second signals $S_1'$ and $S_2'$. The fourth output filter 185D in some embodiments is configured to pass only the first attenuated, first signal $S_1'$. Consequently, the fourth output filter 185D may output the first attenuated, first signal $S_1'$ to the input 169 of the temperature measurement controller 161.

The fifth output filter 185E receives the first and second signals $S_1$ and $S_2$ via the first input filter 184A and the first node $N_1$. The first and second signals $S_1$ and $S_2$ at the fifth output filter 185E are unattenuated and unchanged. The fifth output filter 185E in some embodiments is configured to pass neither of the first and second signals $S_1$ and $S_2$. Consequently, the fifth output filter 185E does not output any portion of the first and second signals $S_1$ and $S_2$ to the temperature measurement controller 161.

FIG. 5 illustrates the multiple temperature sensor system 120 of FIG. 3 during operation, showing only the third and fourth injected time-varying signals $S_3$ and $S_4$ for simplicity and clarity. The second input filter 184B substantially passes the third and fourth signals $S_3$ and $S_4$ and substantially blocks the first and second signals $S_1$ and $S_2$. The second cable resistance $R_{C2}$ 194 couples the third and fourth signals $S_3$ and $S_4$ to the fifth node $N_5$.

The second temperature-sensing resistor $R_{T2}$ 187 receives the third and fourth signals $S_3$ and $S_4$ via the fifth node $N_5$ and the second cable resistance $R_{C2}$ 194. The third and fourth signals $S_3$ and $S_4$ will mainly flow downward through the second temperature-sensing resistor $R_{T2}$ 187, generating second attenuated, third and fourth signals $S_3''$ and $S_4''$. This portion of the $S_3$ and $S_4$ signals will subsequently pass through the third cable resistance $R_{C3}$ 196 to the fourth node $N_4$, reaching the third output filter 185C.

However, the third and fourth signals $S_3$ and $S_4$ will also flow upward through the first temperature-sensing resistor $R_{T1}$ 186, through the first cable resistance $R_{C1}$ 192, and through the first node $N_1$ in order to reach the first output filter 185A and the fifth output filter 185E. A small portion of the electrical current of the third and fourth signals $S_3$ and $S_4$ will pass upward through the first temperature-sensing resistor $R_{T1}$ 186 in this manner to produce first attenuated, third and fourth signals $S_3'$ and $S_4'$.

The first output filter 185A receives the first attenuated, third and fourth signals $S_3'$ and $S_4'$ via the first node $N_1$. The first output filter 185A in some embodiments is configured to pass neither of the first attenuated, third and fourth signals $S_3'$ and $S_4'$. Consequently, the first output filter 185A does not output any portion of the third and fourth signals $S_3$ and $S_4$ to the temperature measurement controller 161.

The second output filter 185B receives the third and fourth signals $S_3$ and $S_4$ from the second node $N_2$ and the second input filter 184B. The third and fourth signals $S_3$ and $S_4$ are unattenuated. The second output filter 185B in some embodiments is configured to pass the third and fourth signals $S_3$ and $S_4$. Consequently, the second output filter 185B may output the third and fourth signals $S_3$ and $S_4$ to the input 167 of the temperature measurement controller 161. These unattenuated third and fourth signals $S_3$ and $S_4$ may be used for comparisons to attenuated versions.

The third output filter 185C receives the second attenuated, third and fourth signals $S_3''$ and $S_4''$. The third output filter 185C in some embodiments is configured to pass only the second attenuated, third signal $S_3''$. Consequently, the third output filter 185C may output the second attenuated, third signal $S_3''$ to the input 169 of the temperature measurement controller 161.

The fourth output filter 185D receives the third and fourth signals $S_3$ and $S_4$ from the output of the second input filter 184B. The fourth output filter 185D in some embodiments is configured to pass neither of the third and fourth signals $S_3$ and $S_4$. Consequently, the fourth output filter 185D does not output any portion of the third and fourth signals $S_3$ and $S_4$ to the temperature measurement controller 161.

The fifth output filter 185E receives the first attenuated, third and fourth signals $S_3'$ and $S_4'$. The fifth output filter 185E in some embodiments is configured to pass only the first attenuated, fourth signal $S_4'$. Consequently, the fifth output filter 185E may output the first attenuated, fourth signal $S_4'$ to the input 169 of the temperature measurement controller 161.

Figure 6:
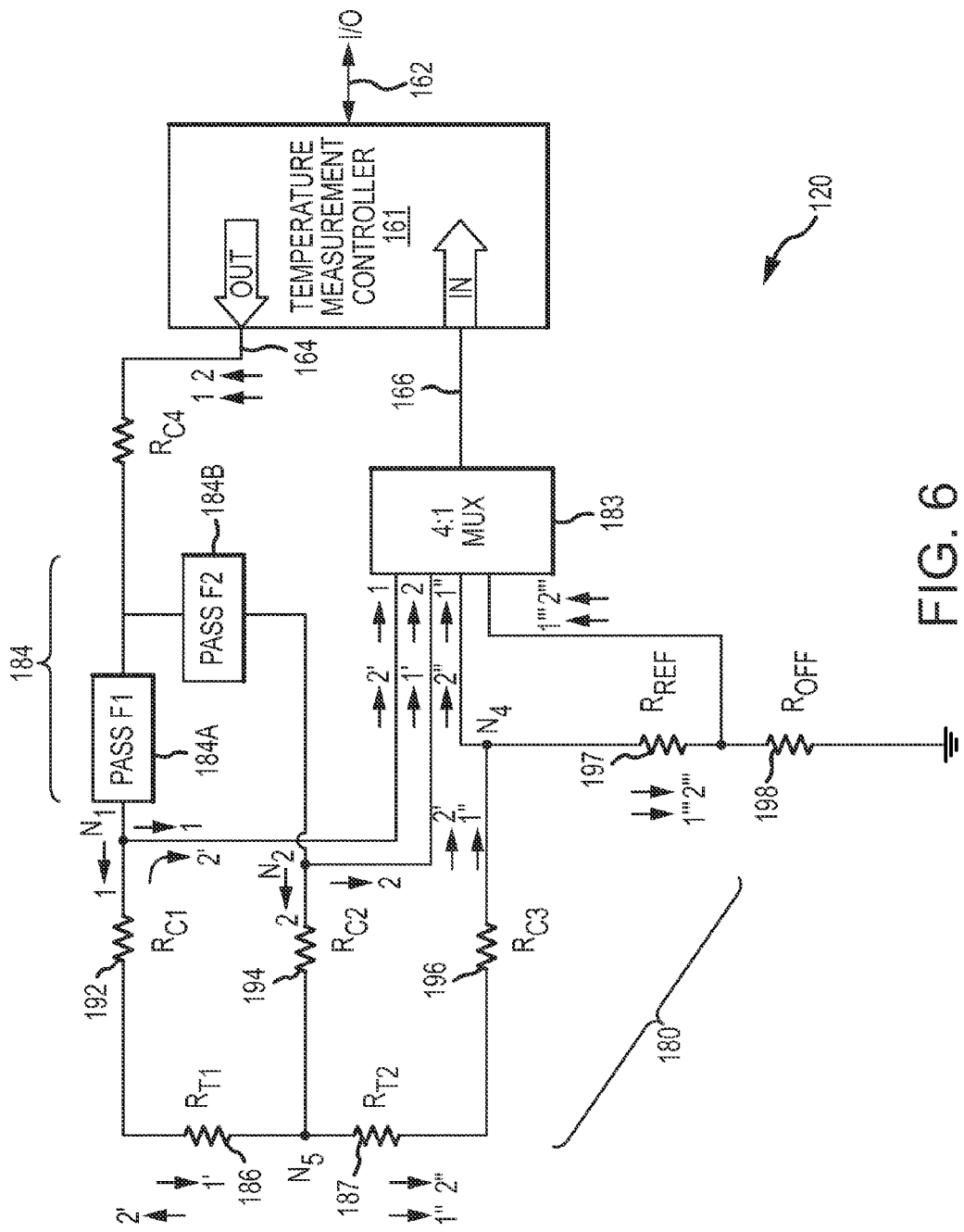
FIG. 6 shows the multiple temperature sensor system according to another embodiment of the invention.

FIG. 6 shows the multiple temperature sensor system 120 according to another embodiment of the invention. The temperature measurement controller 161 generates two distinct time-varying signals $S_1$-$S_2$ and injects them into the temperature sensor network 180. In this embodiment, the temperature sensor network 180 includes a multiplexer (MUX) 183 in place of the output filters 185. The MUX 183 can comprise a 4:1 MUX, as shown, wherein the four MUX inputs can be serially selected and transferred to the MUX's single output.

In this embodiment, the plurality of frequency-selective filters 184, 185 comprises a plurality of frequency-selective input filters 184 coupled to the plurality of temperature-sensing resistors $R_{T1}$ and $R_{T2}$ 186, 187 and passing the plurality of distinct time-varying signals from the temperature measurement controller 161 into the temperature sensor network 180 and a multiplexer 183 coupled to the plurality of temperature-sensing resistors $R_{T1}$ and $R_{T2}$ 186, 187 and passing the plurality of attenuated distinct time-varying signals from the temperature sensor network 180 into the temperature measurement controller 161.

The temperature measurement controller 161 generates first and second time-varying signals $S_1$ and $S_2$ at the controller's output 164. The first signal $S_1$ is passed by the first input filter 184A and is outputted to the first node $N_1$. The second signal $S_2$ is passed by the second input filter 184B and is outputted to the second node $N_2$.

The MUX 183 receives the unattenuated first signal $S_1$ at input 1. The MUX 183 also receives the first attenuated, second signal $S_2'$ at the input 1, via the second cable resistance $R_{C2}$ 194, the first temperature-sensing resistor $R_{T1}$ 186, the first cable resistance $R_{C1}$ 192, and the first node $N_1$. The first attenuated, second signal $S_2'$ has been attenuated by the first temperature-sensing resistor $R_{T1}$ 186.

The MUX 183 receives the unattenuated second signal $S_2$ at input 2. The MUX 183 also receives the first attenuated, first signal $S_1'$ at the input 2, via the first cable resistance $R_{C1}$ 192, the first temperature-sensing resistor $R_{T1}$ 186, the second cable resistance $R_{C2}$ 194, and the second node $N_2$. The first attenuated, first signal $S_1'$ has been attenuated by the first temperature-sensing resistor $R_{T1}$ 186.

The MUX 183 receives the second attenuated, first and second signals $S_1''$ and $S_2''$ at input 3. The second attenuated, first signal $S_1''$ has been attenuated by both the first temperature-sensing resistor $R_{T1}$ 186 and the second temperature-sensing resistor $R_{T2}$ 187. The second attenuated, second signal $S_2$" has been attenuated by the second temperature-sensing resistor $R_{T2}$ 187.

The MUX 183 receives the third attenuated, first and second signals $S_1$''' and $S_2$''' at input 4. The third attenuated, first signal $S_1$''' has been attenuated by the first temperature-sensing resistor $R_{T1}$ 186, the second temperature-sensing resistor $R_{T2}$ 187, and the first reference resistor $R_{REF1}$. The third attenuated, second signal $S_2$''' has been attenuated by the second temperature-sensing resistor $R_{T2}$ 187 and the reference resistor $R_{REF}$ 197.

The MUX 183 may be configured to serially shift each of the inputs onto the controller input 166. Consequently, the temperature measurement controller 161 has available the original signals $S_1$ and $S_2$, the first attenuated, first and second signals $S_1$' and $S_2$', the second attenuated, first and second signals $S_1$" and $S_2$", and the third attenuated, first and second signals $S_1$''' and $S_2$'''. The temperature measurement controller 161 therefore can generate a first temperature measurement value, related to the first temperature-sensing resistor $R_{T1}$ 186, from the versions $S_1$, $S_1$', $S_1$", and $S_1$'''. Likewise, the temperature measurement controller 161 can generate a second temperature measurement value, related to the second temperature-sensing resistor $R_{T2}$ 187, from the versions $S_2$, $S_2$', $S_2$", and $S_2$'''.

Figure 7:
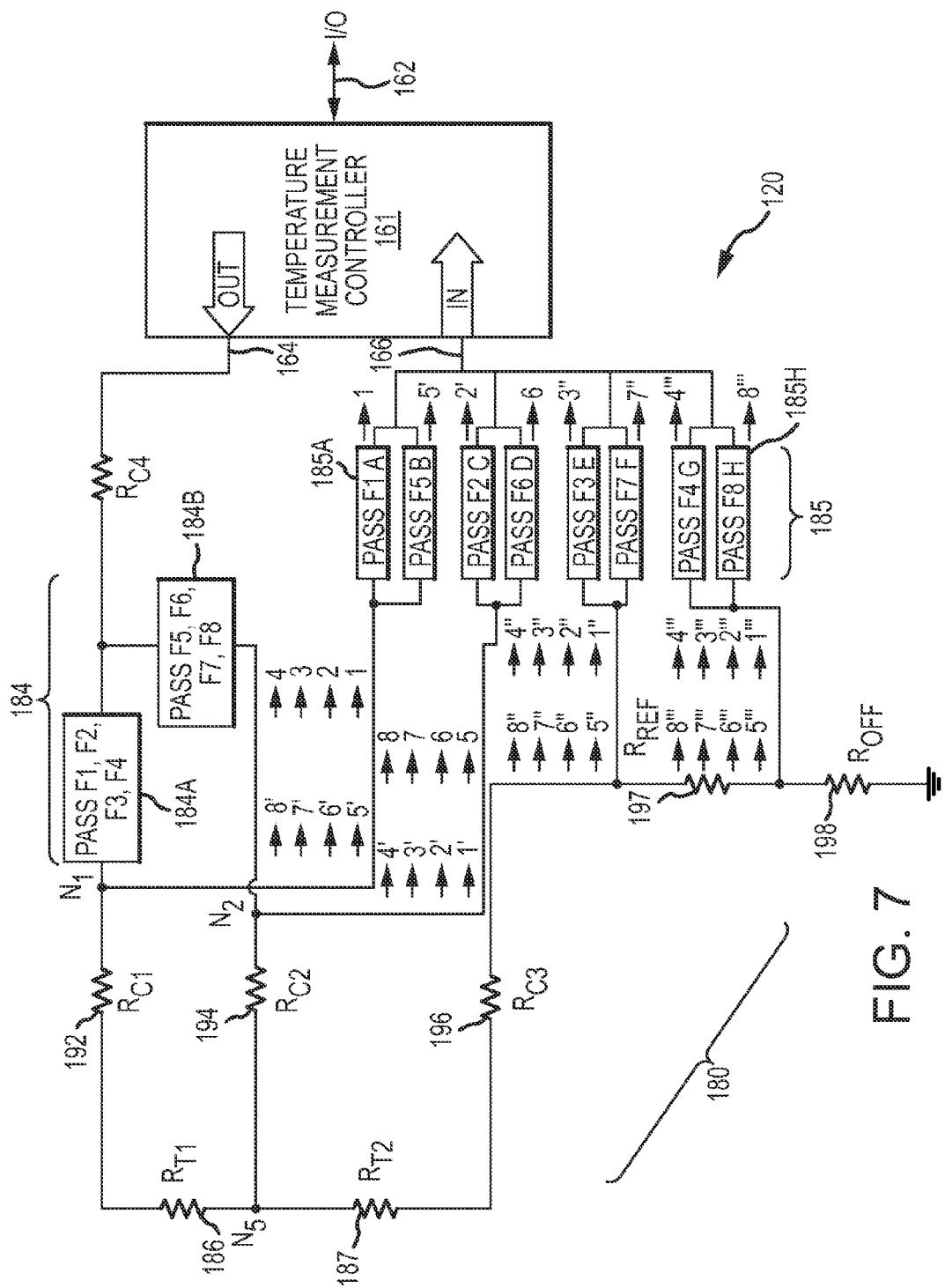
FIG. 7 shows the multiple temperature sensor system according to another embodiment of the invention.

FIG. 7 shows the multiple temperature sensor system 120 according to another embodiment of the invention. FIG. 7 differs from the embodiment of FIG. 3 in that the temperature measurement controller 161 has a single input 166. As a consequence, more output filters 185 are needed. Consequently, the temperature measurement controller 161 generates eight distinct time-varying signals $S_1$-$S_8$ and injects them into the temperature sensor network 180. In this embodiment, the bank of multiple output filters 185A-185H is used to receive and discriminate the signals. However, this embodiment does not employ a stereo codec or other device having two inputs, so the temperature measurement controller 161 is shown with only a single input 166. The temperature measurement controller 161 can comprise a mono codec, for example. Consequently, eight distinct time-varying signals are employed in order to produce distinct attenuated signal versions at the controller input 166.

In this embodiment, the plurality of frequency-selective filters 184, 185 comprises two frequency-selective input filters 184A, 184B coupled to the plurality of temperature-sensing resistors $R_{T1}$ and $R_{T2}$ 186, 187 and passing four time-varying signals from the temperature measurement controller 161 into corresponding nodes of the temperature sensor network 180 and eight frequency-selective output filters 185A-185H coupled to the plurality of temperature-sensing resistors $R_{T1}$ and $R_{T2}$ 186, 187 and passing at least four attenuated distinct time-varying signals from the temperature sensor network 180 into the temperature measurement controller 161. The eight frequency-selective output filters 185A-185H include a single output to the temperature measurement controller 161.

Figure 8:
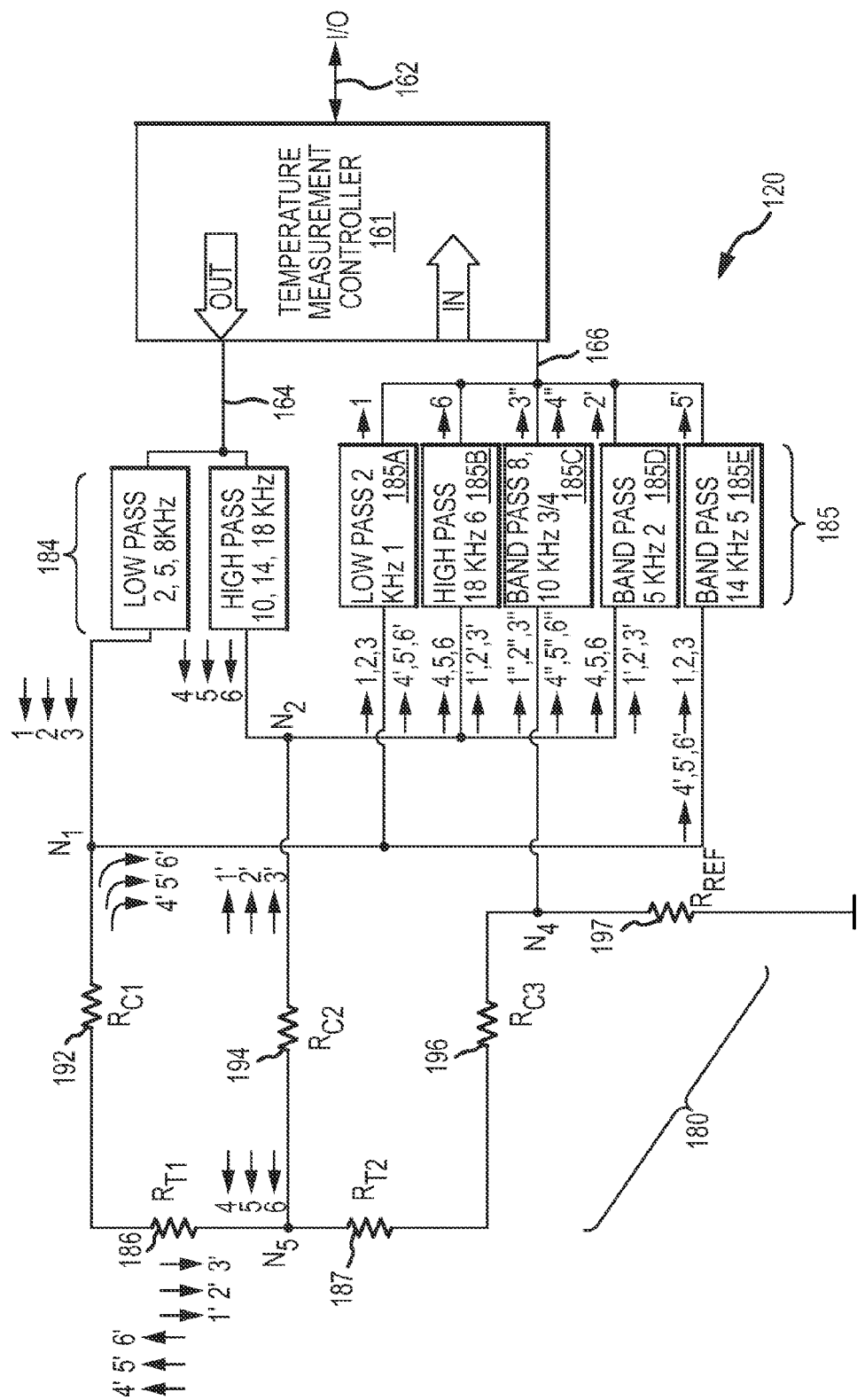
FIG. 8 shows the multiple temperature sensor system according to another embodiment of the invention.

FIG. 8 shows the multiple temperature sensor system 120 according to another embodiment of the invention. The temperature measurement controller 161 generates six distinct time-varying signals $S_1$-$S_6$ and injects them into the temperature sensor network 180. FIG. 8 differs from other embodiments in that the offset resistor $R_{OFF}$ 198 and the coupling resistor $R_{C4}$ of FIGS. 6 and 7 have been eliminated. This is done where the temperature measurement controller 161 has a single input.

A typical audio codec design requires that the input signals are DC biased to a point which is equal to the middle of a common mode input range ($V_{bias}$). Because of this, the design of the input filters for a codec should optimally have their outputs biased to $V_{bias}$, to maximize the dynamic range of the codec. This biasing can be done in the filters themselves using simple and commonly available active filters. The bias also comes with another advantage; the circuit no longer needs to utilize the ground offset resistor $R_{OFF}$ 198. The purpose of $R_{OFF}$ 198 in the DC RTD circuit (see FIG. 2) is to counteract the A/D linearity errors near ground potential. If the output of the input filters is DC biased to the middle of the codec's common mode range, this offset is no longer necessary. Removing $R_{OFF}$ 198 provides another unique advantage in that two of the measurements from the DC circuit can be removed, further simplifying the number of frequencies and filters needed. In addition, the middle output filter 185C may comprise a bandpass filter designed to pass the two middle frequencies, i.e., $S_3$ and $S_4$. This may be done in order to eliminate a filter.

In this embodiment, the plurality of frequency-selective filters 184, 185 comprises two frequency-selective input filters 184A, 184B coupled to the plurality of temperature-sensing resistors $R_{T1}$ and $R_{T2}$ 186, 187 and passing four time-varying signals from the temperature measurement controller 161 into corresponding nodes of the temperature sensor network 180 and five frequency-selective output filters 185A-185E coupled to the plurality of temperature-sensing resistors $R_{T1}$ and $R_{T2}$ 186, 187 and passing at least four attenuated distinct time-varying signals from the temperature sensor network 180 into the temperature measurement controller 161. The five frequency-selective output filters 185A-185E include a single output to the temperature measurement controller 161.

The system and method according to any of the embodiments may provide several benefits. The system and method is capable of reading multiple resistive sensors without requiring a switch, where a switch may generate noise. The system and method is capable of generating two or more temperature measurements from two or more temperature-sensing resistive devices. The system and method can generate two or more simultaneous temperature measurements. The system and method is capable of simultaneously reading multiple resistive sensors. The system and method uses distinct frequencies or frequency bands to generate distinct electrical currents that can be decoded to provide distinct temperature measurements.

We claim:

1. A multiple temperature sensor system (120), comprising:
   a temperature sensor network (180) comprising:
      a plurality of temperature-sensing resistors $R_{T1}$ and $R_{T2}$ (186, 187); and
      a plurality of frequency-selective filters (184, 185) coupled to the plurality of temperature-sensing resistors $R_{T1}$ and $R_{T2}$ (186, 187), with the plurality of frequency-selective filters (184, 185) passing a plurality of distinct time-varying signals into the temperature sensor network (180) and passing a plurality of attenuated distinct time-varying signals out of the temperature sensor network (180); and
   a temperature measurement controller (161) coupled to the temperature sensor network (180) and configured to generate and inject the plurality of distinct time-varying signals into the temperature sensor network (180), receive the plurality of attenuated distinct time-varying signals from the temperature sensor network (180) in response to the injection, with the plurality of attenuated distinct time-varying signals being attenuated by the plurality of temperature sensing resistors (186, 187), and generate two or more substantially simultaneous temperature values from the plurality of attenuated distinct time-varying signals.

2. The multiple temperature sensor system (120) of claim 1, wherein the multiple temperature sensor system (120) comprises a component of a Coriolis mass flow meter.

3. The multiple temperature sensor system (120) of claim 1, wherein the multiple temperature sensor system (120) comprises a component of a vibrating densitometer.

4. The multiple temperature sensor system (120) of claim 1, with the plurality of frequency-selective filters (184, 185) comprising:
　a plurality of frequency-selective input filters (184) coupled to the plurality of temperature-sensing resistors $R_{T1}$ and $R_{T2}$ (186, 187) and passing the plurality of distinct time-varying signals from the temperature measurement controller (161) into the temperature sensor network (180); and
　a plurality of frequency-selective output filters (185) coupled to the plurality of temperature-sensing resistors $R_{T1}$ and $R_{T2}$ (186, 187) and passing the plurality of attenuated distinct time-varying signals from the temperature sensor network (180) into the temperature measurement controller (161).

5. The multiple temperature sensor system (120) of claim 1, with the plurality of frequency-selective filters (184, 185) comprising:
　two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
　five frequency-selective output filters (185A-185E) coupled to the plurality of temperature-sensing resistors $R_{T1}$ and $R_{T2}$ (186, 187) and passing at least four attenuated distinct time-varying signals from the temperature sensor network (180) into the temperature measurement controller (161).

6. The multiple temperature sensor system (120) of claim 1, with the plurality of frequency-selective filters (184, 185) comprising:
　two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
　five frequency-selective output filters (185A-185E) coupled to the plurality of temperature-sensing resistors $R_{T1}$ and $R_{T2}$ (186, 187) and passing at least four attenuated distinct time-varying signals from the temperature sensor network (180) into the temperature measurement controller (161), with the five frequency-selective output filters (185A-185E) including two outputs to the temperature measurement controller (161).

7. The multiple temperature sensor system (120) of claim 1, with the plurality of frequency-selective filters (184, 185) comprising:
　a plurality of frequency-selective input filters (184) coupled to the plurality of temperature-sensing resistors $R_{T1}$ and $R_{T2}$ (186, 187) and passing the plurality of distinct time-varying signals from the temperature measurement controller (161) into the temperature sensor network (180); and
　a multiplexer (183) coupled to the plurality of temperature-sensing resistors $R_{T1}$ and $R_{T2}$ (186, 187) and passing the plurality of attenuated distinct time-varying signals from the temperature sensor network (180) into the temperature measurement controller (161).

8. The multiple temperature sensor system (120) of claim 1, with the plurality of frequency-selective filters (184, 185) comprising:
　two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
　eight frequency-selective output filters (185A-185H) coupled to the plurality of temperature-sensing resistors $R_{T1}$ and $R_{T2}$ (186, 187) and passing at least four attenuated distinct time-varying signals from the temperature sensor network (180) into the temperature measurement controller (161).

9. The multiple temperature sensor system (120) of claim 1, with the plurality of frequency-selective filters (184, 185) comprising:
　two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
　eight frequency-selective output filters (185A-185H) coupled to the plurality of temperature-sensing resistors $R_{T1}$ and $R_{T2}$ (186, 187) and passing at least four attenuated distinct time-varying signals from the temperature sensor network (180) into the temperature measurement controller (161), with the eight frequency-selective output filters (185A-185H) including a single output to the temperature measurement controller (161).

10. The multiple temperature sensor system (120) of claim 1, with the plurality of frequency-selective filters (184, 185) comprising:
　two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
　five frequency-selective output filters (185A-185E) coupled to the plurality of temperature-sensing resistors $R_{T1}$ and $R_{T2}$ (186, 187) and passing at least four attenuated distinct time-varying signals from the temperature sensor network (180) into the temperature measurement controller (161), with the five frequency-selective output filters (185A-185E) including a single output to the temperature measurement controller (161).

11. A multiple temperature sensor system (120), comprising:
　a temperature sensor network (180) comprising:
　　a plurality of temperature-sensing resistors $R_{T1}$ and $R_{T2}$ (186, 187);
　　a plurality of frequency-selective input filters (184) coupled to the plurality of temperature-sensing resistors $R_{T1}$ and $R_{T2}$ (186, 187) and passing a plurality of distinct time-varying signals into the temperature sensor network (180); and a plurality of frequency-selective output filters (185) coupled to the plurality of temperature-sensing resistors $R_{T1}$ and $R_{T2}$ (186, 187) and passing a plurality of attenuated distinct time-varying signals out of the temperature sensor network (180); and a temperature measurement controller (161) coupled to the temperature sensor network (180) and configured to generate and inject the plurality of distinct time-varying signals into the temperature sensor network (180), receive the plurality of attenuated distinct time-varying signals from the temperature sensor network (180) in response to the injection, with the plurality of attenuated distinct time-varying signals being attenuated by the plurality of temperature sensing resistors (186, 187), and generate two or more substantially simultaneous temperature values from the plurality of attenuated distinct time-varying signals.

12. The multiple temperature sensor system (120) of claim 11, wherein the multiple temperature sensor system (120) comprises a component of a Coriolis mass flow meter.

13. The multiple temperature sensor system (120) of claim 11, wherein the multiple temperature sensor system (120) comprises a component of a vibrating densitometer.

14. The multiple temperature sensor system (120) of claim 11, wherein:
the plurality of frequency-selective input filters (184) comprises two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
the plurality of frequency-selective output filters (185) comprises five frequency-selective output filters (185A-185E) coupled to the plurality of temperature-sensing resistors $R_{T1}$ and $R_{T2}$ (186, 187) and passing at least four attenuated distinct time-varying signals from the temperature sensor network (180) into the temperature measurement controller (161).

15. The multiple temperature sensor system (120) of claim 11, wherein:
the plurality of frequency-selective input filters (184) comprises two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
the plurality of frequency-selective output filters (185) comprises five frequency-selective output filters (185A-185E) coupled to the plurality of temperature-sensing resistors $R_{T1}$ and $R_{T2}$ (186, 187) and passing at least four attenuated distinct time-varying signals from the temperature sensor network (180) into the temperature measurement controller (161), with the five frequency-selective output filters (185A-185E) including two outputs to the temperature measurement controller (161).

16. The multiple temperature sensor system (120) of claim 11, wherein:
the plurality of frequency-selective output filters (185) comprises a multiplexer (183) coupled to the plurality of temperature-sensing resistors $R_{T1}$ and $R_{T2}$ (186, 187) and passing the plurality of attenuated distinct time-varying signals from the temperature sensor network (180) into the temperature measurement controller (161).

17. The multiple temperature sensor system (120) of claim 11, wherein:
the plurality of frequency-selective input filters (184) comprises two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
the plurality of frequency-selective output filters (185) comprises eight frequency-selective output filters (185A-185H) coupled to the plurality of temperature-sensing resistors $R_{T1}$ and $R_{T2}$ (186, 187) and passing at least four attenuated distinct time-varying signals from the temperature sensor network (180) into the temperature measurement controller (161).

18. The multiple temperature sensor system (120) of claim 11, wherein:
the plurality of frequency-selective input filters (184) comprises two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
the plurality of frequency-selective output filters (185) comprises eight frequency-selective output filters (185A-185H) coupled to the plurality of temperature-sensing resistors $R_{T1}$ and $R_{T2}$ (186, 187) and passing at least four attenuated distinct time-varying signals from the temperature sensor network (180) into the temperature measurement controller (161), with the eight frequency-selective output filters (185A-185H) including a single output to the temperature measurement controller (161).

19. The multiple temperature sensor system (120) of claim 11, wherein:
the plurality of frequency-selective input filters (184) comprises two frequency-selective input filters (184A, 184B) coupled to the plurality of temperature-sensing resistors $R_{T1}$ and $R_{T2}$ (186, 187) and passing four time-varying signals from the temperature measurement controller (161) into corresponding nodes of the temperature sensor network (180); and
the plurality of frequency-selective output filters (185) comprises five frequency-selective output filters (185A-185E) coupled to the plurality of temperature-sensing resistors $R_{T1}$ and $R_{T2}$ (186, 187) and passing at least four attenuated distinct time-varying signals from the temperature sensor network (180) into the temperature measurement controller (161), with the five frequency-selective output filters (185A-185E) including a single output to the temperature measurement controller (161).

20. A temperature determination method for a multiple temperature sensor system, the method comprising:
generating a plurality of distinct time-varying signals with a temperature measurement controller,
injecting the plurality of distinct time-varying signals into a temperature sensor network including a plurality of temperature-sensing resistors and a plurality of frequency-selective filters, with the plurality of frequency-selective filters comprising:
a plurality of frequency-selective output filters coupled to the plurality of temperature-sensing resistors and passing the plurality of distinct time-varying signals from the temperature measurement controller into the temperature sensor network; and a plurality of frequency-selective input filters coupled to the plurality of temperature-sensing resistors and passing the plurality of attenuated distinct time-varying signals from the temperature sensor network into the temperature measurement controller;

receiving a plurality of attenuated distinct time-varying signals from the temperature sensor network in response to the injection, with the plurality of attenuated distinct time-varying signals being attenuated by the plurality of temperature sensing resistors; and generating two or more substantially simultaneous temperature values from the plurality of attenuated distinct time-varying signals.

21. The method of claim 20, wherein the multiple temperature sensor system comprises a component of a Coriolis mass flow meter.

22. The method of claim 20, wherein the multiple temperature sensor system comprises a component of a vibrating densitometer.

* * * * *